Patented July 10, 1945

2,380,020

UNITED STATES PATENT OFFICE 2,380,020

AQUEOUS DISPERSIONS OF HARDENED OR TANNED PROTEIN SALTS

George H. Brother, Berkeley, Calif., and Allan K. Smith, Peoria, Ill.

No Drawing. Application March 20, 1943, Serial No. 479,902

4 Claims. (Cl. 106—146)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

This application is a continuation in part of our application Serial No. 231,902, filed September 27, 1938, which is in turn a continuation in part of application Serial No. 208,260 (now Patent No. 2,210,481).

In these previous applications, disclosure was made and methods for the preparation outlined and described of stable aqueous protein dispersions containing excess formaldehyde as a tanning or hardening agent. Coatings or films produced by the application and drying of these solutions were found to be completely tanned or hardened, more completely and uniformly than any produced previously, and that without any subsequent treatment. This was new to the art. However, the concentration of protein in the solutions was low, never above 5% and averaging considerably lower. This was recognized to be a serious handicap to the general application of these dispersions in the coating, sizing, finishing fields, the standard stock protein dispersions being made up on pound of air dry protein to the gallon.

The object of our present invention is the production of stable aqueous protein dispersions, containing over 9% protein and excess of formaldehyde or other organic tanning or hardening agent to completely tan or harden the protein.

Another object of our invention is the production of stable aqueous protein dispersions, containing over 9% protein and excess formaldehyde or other organic tanning or hardening agent which, upon drying, produce films of completely and uniformly tanned or hardened protein.

A further object of our invention is the production of stable aqueous protein dispersions, consisting essentially of over 9% protein, excess formaldehyde or other agent sufficient to completely and uniformly harden or tan all the protein which, upon drying, produce films or coatings of more completely and uniformly hardened or tanned protein than have been possible by any previous process.

Various other objects and advantages will be apparent as the nature of the invention is more fully disclosed.

Although the novel features which are characteristic of this invention are pointed out more particularly in the claims appended hereto, the invention itself may be better understood by referring to the following description in which certain specific embodiments thereof are set forth for purposes of illustration.

Certain specific terms are used herein to refer to various details of the invention. It is to be understood, however, that these terms are to be given as broad an interpretation as the state of the art will permit.

The present process comprises in general the dispersion of partially hydrolyzed protein, derived from soybean meal, cottonseed meal, peanut meal, linseed meal, or the like, or from casein, glue, gelatin or albumin, in aqueous solutions of salts, such as sodium borate, trisodium phosphate, and adjusting the pH of the solution to 7.0–8.0 before adding the aldehyde or other tanning or hardening agent. The resulting solution, provided formaldehyde is the hardening agent added, must be within the pH range of 5.7 to 7.5.

The progress of development of water-proofed protein adhesives in the art has been indicated in U. S. Patent 2,210,481. It is shown therein that, although formaldehyde was well known to those skilled in the art to be the best hardening agent for proteins, the addition of formaldehyde to protein dispersions caused the same to gel within a short time (U. S. 1,976,435), coagulating out the protein and rendering it worthless as an adhesive (S. Satow, Tech. Reports Tohoku Imp. Univ. (Japan), 3, #4, 199–269, (1923); Lawrence Bradshaw, U. S. Pat. 1,895,433; G. G. Pierson, U. S. Pat. 1,964,960; T. Satow, U. S. Pat. 1,994,050). There will be found occasional apparent exceptions, such as, for example Wetter, Brit. Pat. 16,490, June 16, 1904, in which formaldehyde, amount or concentration not specified, but certainly not in sufficient quantity to constitute an excess, is added to aqueous protein dispersions in some alkali, usually ammonia being mentioned or specified. It is a well known and established fact that formaldehyde and ammonia react to form hexamethylenetetramine, thus neutralizing the action of formaldehyde on protein and hexamethylenetetramine has no hardening action on protein. These apparent exceptions are thus seen to be actually confirmations of the well known fact that it is impossible to add formaldehyde to aqueous alkaline protein dispersions without gelling, coagulating and rendering the protein unfit for adhesive purposes, unless there were present an agent to neutralize or inhibit the hardening action of the formaldehyde. There is no mention of pH values, no evidence that the effect of different degrees of alkalinity or acidity were investigated, so there is no doubt that the formaldehyde was added to strongly alkaline protein dispersions. Under these conditions instability of the dispersion as manifested by gelling or coagulation of the protein in a state unfit for adhesive purposes is to be expected.

Our invention differs from all previous work done in this field in the fact that we have produced stable aqueous dispersions containing 9% or above protein, which are commercially useful concentrations, with formaldehyde or other active organic hardening agent present in excess of that required to completely harden all the protein. This has been accomplished by the preparation of borate or phosphate salts of partially hydrolyzed protein, the adjustment of their aqueous dispersion to a pH of 7.0 to 8.0 before the addition of formaldehyde and the maintenance of the narrow pH range of 5.7 to 7.5 for the protein salt-formaldehyde dispersion. We have found that native or not-properly-hydrolyzed proteins in aqueous dispersions, even with borates or phosphates present and maintained within the prescribed pH range are not stable and tend to gel in a short time. We have also found that proteins or partially hydrolyzed protein in aqueous dispersion of a pH 8.5 or above gel very quickly upon the addition of formaldehyde. It is possible to prepare stable aqueous protein dispersions containing 9% protein or above, only by following and carefully controlling the procedure of our invention.

This procedure involves first the preparation of the protein hydrolysate. If the protein material is a purified protein, such as casein, soybean protein, peanut protein or the like, it may be mixed with 0.6% caustic soda at room temperature and allowed to stand for 16 to 20 hours, the hydrolysate coagulated by the addition of an acid, such as sulphuric, and filtered. In case a somewhat more concentrated caustic soda solution is used, or if a higher temperature than normal room, the time of contact of the protein and caustic solution should be reduced. Some modification may be necessary in case of proteins prepared so as to vary much from an average purified protein. The treatment suggested produces in average proteins about the degree of hydrolysis which has been found by us to be the best. In the case of protein meals, containing carbohydrates, fiber, etc., in addition to protein, two treatments have been found applicable, hydrolysis by caustic solutions and hydrolysis by enzymatic action. In the first, the meal may be extracted with 0.6% caustic soda solution successively several times, centrifuging after each extraction to separate the extracted protein dispersions, which are then treated as described above. Or the meal may be mixed with water and allowed to stand about 20 hours to self sour, which coagulates the protein. This is filtered off and is ready for the next treatment, a hydrolysate of a somewhat different nature from those produced by the alkaline treatment.

The hydrolysate curd is mixed wet with borax or trisodium phosphate crystals and heated moderately to dispersion. A small amount of ammonia may be added to produce a clear dispersion, although this is not essential, and the pH is adjusted to 8.0 or below by the addition of a weak acid, such as formic, if necessary. The curd may also be dispersed in a weak caustic solution and boric acid added to bring it to a pH of 8.0 or below. The amount of water necessary to bring the dispersion to a concentration of 9% or above protein is calculated and 40% formalin solution sufficient to give an excess over that required to harden the protein is included as part of this amount. This formaldehyde solution is added to the protein dispersion and stirred well. Protein-formaldehyde dispersions produced in this way have remained fluid with no change in viscosity for weeks and months.

The pH range of 5.7 to 7.5 is favorable not only to the preparation of stable protein salt-formaldehyde dispersions, but also to improved water resistance of the hardened protein films or coatings produced upon the drying of these dispersions after application. Brother and McKinney have shown (Ind. Eng. Chem., 30, 1236, (1938)) that protein hardened with formaldehyde has the maximum water resistance if the treatment was performed at the isoelectric point of the protein. The pH range here specified, 5.7 to 7.5, is on the alkaline side of the isoelectric point of the protein, so is on the ascending curve of water absorption, but it lies far below the pH at which it has been the practice to harden the deposited dried films.

The protein salt-formaldehyde dispersions described in this application will find wide application in the sizing of paper and the finishing of leather. In both of these fields, there has long been a need for a protein dispersion which is neutral or slightly acid in reaction, rather than strongly alkaline. There has also been the need for water-resistant binders for pigments. The dispersions of our invention fulfill both requirements. In addition, there are numerous other possible applications, such as the preparation of grease- and oil-proof sizes for fiber containers, paper coatings, laminated plastics, and the like.

In order to more clearly illustrate our invention, the following specific examples are set forth. They are merely illustrative and in no sense are to be taken as limiting the scope or application of the invention.

*Example 1.*—One kilogram of oil-free soybean meal (solvent extracted) was thoroughly mixed in any known manner with about 15 times its weight of 0.6% aqueous solution of sodium hydroxide (caustic soda). The undispersed portion was separated by decantation, filtration or centrifuging and mixed with a similar quantity of fresh caustic solution. In this way the soybean meal was extracted two or three times with 0.6% caustic solution and the major part of the protein dispersed therein. The combined protein extracts were allowed to stand at room temperature (77° F.) for about 20 hours. The partially hydrolyzed protein was then coagulated by the gradual addition of an acid, such as sulphuric, and the curd was separated by centrifuging or filtration. The wet curd was then dispersed by adding approximately 10% dry borax and heating to 122 to 140° F. until dispersion is complete. A small amount of ammonia may be added if necessary to produce a clear dispersion. The dispersion was cooled to room temperature and water and formaldehyde added so as to give a final dispersion containing 10% protein and 5 to 20% formaldehyde. A 4% formaldehyde dispersion prepared in this way had a pH of 5.9 and showed no signs of gel formation after standing at room temperature for 6 months.

*Example 2.*—To 25 grams of commercial soybean (trade name soybean alpha protein) were added 150 ml. of 0.6% caustic soda solution and the dispersion was allowed to stand at room temperature (77° F.) for about 20 hours. It was then treated with sulphuric acid solution to coagulate the partially hydrolyzed protein as a wet curd. This was mixed with 2.5 grams dry borax and heated to 122-140° F. until dispersion was complete. After cooling to room temperature, water and formaldehyde were added to total 250 ml. A dispersion containing 4% formaldehyde had a pH of 5.8 and was perfectly stable.

*Example 3.*—To 25 grams lactic acid casein were added 150 ml. of 0.6 caustic soda solution and the dispersion was allowed to stand at room temperature for about 20 hours. Boric acid solution was added to bring the pH down to about 8.0, then water and formaldehyde to total 250 ml. The pH of the dispersion was 6.5. In some cases it may be desirable to add a small amount of ammonia to produce a clear dispersion. In these cases, additional formaldehyde is added to neutralize the ammonia.

*Example 4.*—To 25 grams rennet casein were added 150 ml. of 1.0% caustic soda solution and the dispersion was allowed to stand at room temperature for about 20 hours. The caustic was then largely neutralized by the addition of 1.2 grams of phosphoric acid and water and formaldehyde were added to bring the total volume of the dispersion to 250 ml. The pH of this dispersion was 6.5.

*Example 5.*—100 grams of solvent extracted soybean meal were stirred up well with about 500 ml. water and allowed to stand at room temperature for 24 hours, or until the protein has coagulated out by self souring. Separation is effected by filtration or centrifuging, the residue extracted with 1% caustic soda solution and the excess caustic neutralized with boric acid, to a pH of 8.0 for the dispersion. Water and formaldehyde are then added to bring the total volume of the dispersion to 1 liter. The pH of this dispersion was 6.8 and it was permanent to gelling for months at room temperature.

It is to be noted that in some cases a small amount of ammonia may be added to assist in the dispersion of the partially hydrolyzed protein. This is merely to assist in the preparation of perfectly clear protein dispersions, is in no way essential and part of the invention claimed, and in all cases is completely neutralized by the formaldehyde added to harden the protein.

Having thus described our invention, what we claim for Letters Patent is:

1. A stable aqueous dispersion of hardened protein salts comprising about 9 percent partially hydrolyzed protein salt and about 4 percent excess formaldehyde.

2. A stable aqueous dispersion of hardened protein salts comprising about 9 percent partially hydrolyzed soybean protein salt and about 4 percent excess formaldehyde.

3. A stable aqueous dispersion of hardened protein salts comprising about 9 percent partially hydrolyzed casein salt and about 4 percent excess formaldehyde.

4. A stable aqueous dispersion of hardened protein salts comprising about 9 percent partially hydrolyzed protein salt, and at least 4 percent excess formaldehyde, said dispersion being within the range of pH 5.7 to 7.5.

GEORGE H. BROTHER.
ALLAN K. SMITH.